E. F. GOBATTI.
LOCK NUT DEVICE.
APPLICATION FILED DEC. 10, 1913.
1,138,861.
Patented May 11, 1915.
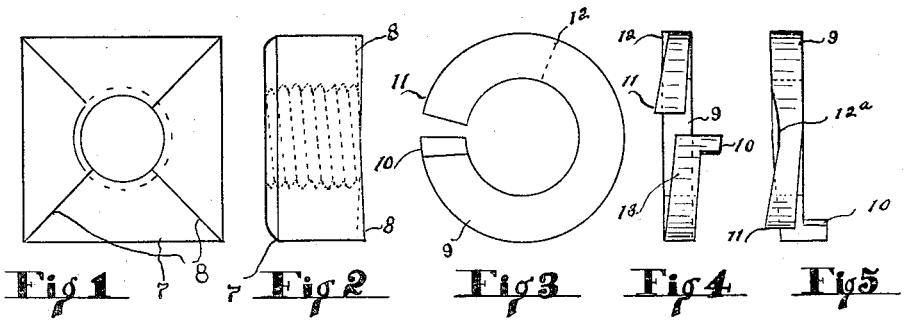
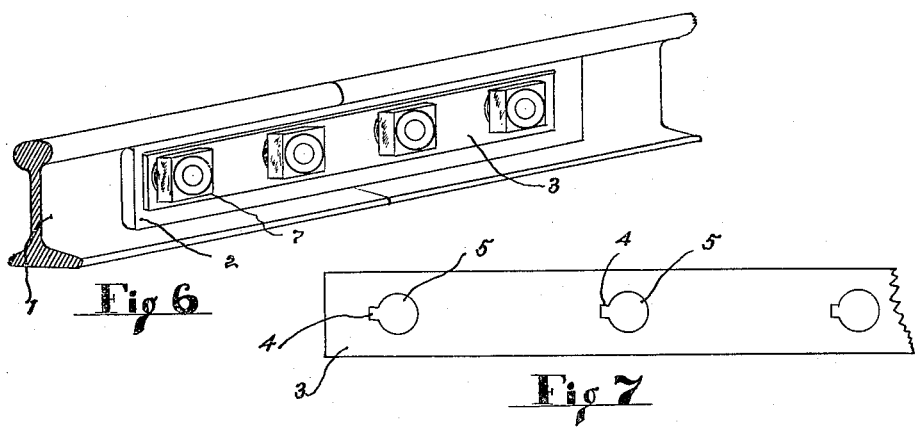
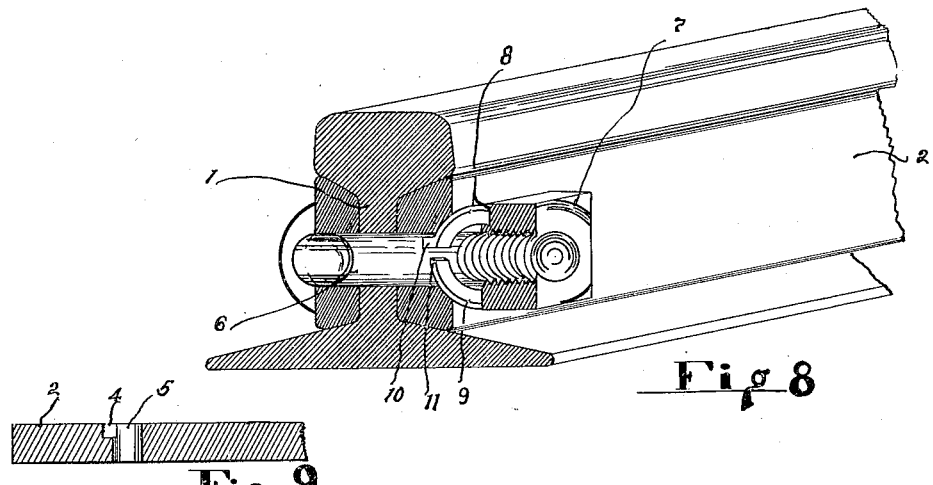
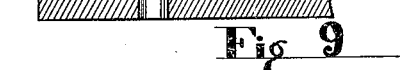
INVENTOR.
Edmund F. Gobatti
BY Lyman Henry
ATTORNEYS.
WITNESSES:
C. M. Walker
Maude S. Engle

UNITED STATES PATENT OFFICE.

EDMUND F. GOBATTI, OF PUEBLO, COLORADO.

LOCK-NUT DEVICE.

1,138,861.   Specification of Letters Patent.   Patented May 11, 1915.

Application filed December 10, 1913. Serial No. 805,765.

*To all whom it may concern:*

Be it known that I, EDMUND F. GOBATTI, a citizen of the United States, residing at Pueblo, Colorado, have invented certain new and useful Improvements in Lock-Nut Devices, of which the following is a specification.

My invention relates to improvements in a lock nut device in which the washer constitutes the locking means in connection with a slot or recess in a washer plate and cams on the inner surface of the nut. And the object of my improvement is to provide a simple lock nut cheaply and easily made.

I attain these objects by the mechanisms illustrated in the accompanying drawings, in which,—

Figure 1 is a plan view of the bearing side of the nut; Fig. 2 is a side elevation view of such nut showing the cams constituting ratchets; Fig. 3 is a plan view of the washer from the underside; Fig. 4 is a perspective view showing the construction of the ends of the split washer; Fig. 5 is a view showing the construction of the washer in a modified form; Fig. 6 shows the application of the lock nut to the rails of a railroad; Fig. 7 is a view in broken section of a washer plate; Fig. 8 is a cross sectional view of a lock nut device; and Fig. 9 is a cross sectional view of a broken section of a fish plate showing the recesses in the fish plate instead of in the washer plate.

Similar numerals refer to similar parts throughout the several drawings.

The ordinary and regularly used bolt 1 for attaching the fish plates to railroad rails is provided with a nut 7 which has on the inner or bearing surface the cams 8 ending in a square shoulder and constituting a ratchet face. A washer plate 3 has therein the holes 5 with the slot or recess 4 adjacent to each of said holes. This washer plate is provided to be used where fish plates are already constructed or in use. In Fig. 9 a cross section of a fish plate is shown wherein the recess 4 is provided to serve the same purpose as the recesses or slots 4 in the fish plate. The cams 8 on the inner side of the nut 7 are provided with square shoulders at the highest point of the cam. The split washer 9 is constructed with a boss 10 adapted to engage the recesses 4 either in the fish plate or in the washer plate 3. The face of the washer 9 next to the fish plate is to be constructed with a straight edge except the boss 10, and then the washer is to be bent so that the inner face of the washer adjacent to the boss 10 will be below the plane of the body of the washer 9, and the end 11 will be above the plane of the inner face of the washer 9, thus constituting, in a measure, a spring effect. The end 11 of the washer is practically of the same thickness as is the body of the washer 9, and from the end 11 the washer is cut away slopingly to a distance back from the end to 12, being slightly in excess, if not exactly the distance from one of the shoulders to the cams 8 on the inner side of the nut 7 to the next shoulder. A shoulder 12, in the washer, as a matter of precaution, may be provided to engage an adjacent shoulder on one of the cams, or to engage such shoulder if the end 11 does not engage a shoulder. While I have provided this second shoulder, it is not necessary for the operation of the washer to constitute a lock nut in connection with other parts; and therefore I have shown in Fig. 5 a modified form of the washer which simply shows a depression at the point 12$^a$ corresponding to the shoulder 12. The portion 13 of the washer 9 adjacent to the boss 10 and at the end, is made thin by gradation, reaching the full thickness of the washer in a distance corresponding approximately to one of the cams on the inner side of the nut 7,—that is to say the thickness of the washer at 13 at the adjacent free end is of such thickness that it will permit the highest part of one of the cams 8 to rest thereon and yet permit the point 11 to engage behind one of the walls or shoulders of said cams. By this construction of the washer the shoulders of the cams on the nut will pass over the point 11 of the split washer 9 and the point will engage the shoulder when the nut is tightened and prevent the nut turning backward because the boss 10 and the other end of the washer is engaged in the recess 4. The spring construction tends to keep said point 11 in active engagement. The sloping surface from 11 to 12 on the upper side of the washer adjacent to the nut, permits the shoulder next behind the one engaged by the point 11 to be free and thereby to permit the spring action in the washer to force the point 11 up into engagement with one of the shoulders on the nut. This method of construction constitutes a cheap method of applying the split washer to constitute a locking device and at the same time makes use of the principle of the spring. It will also be noted that any spiral spring is avoided, and the formerly applied methods of having the inner end of the washer to bite into the face of the fish plate have also been avoided as well as avoiding the application of a ratchet on the inner side of the washer. By the relative width of the different parts of the washer the full use of the cams or rigid portions on the inner side of the nut 7 is utilized. By means of the washer plate 3 my device can be applied to fish plates already constructed and in the construction of new fish plates the plan shown in Fig. 9 may be followed and thus avoid the use of washer plates.

While I am aware that lock nut devices have been invented and that I can not claim broadly such devices, but I do claim:—

In a lock nut of the character described, the combination of a bolt, a nut having ratchets on the bearing face, and a spring split washer having a boss at one end on the side next the bearing surface adapted to engage a recess in the bearing surface, which end is thinner than the body of the washer, the other free end of said washer being as thick as the body of said washer and cut away from last said end to a distance equal to one of said ratchets on said nut and slopingly to the depth corresponding to the height of the shoulder of said ratchets.

EDMUND F. GOBATTI.

Witnesses:
ARTHUR F. RICHIE,
MAUDE S. ENGLE.